United States Patent
Halliwell

(10) Patent No.: US 6,342,272 B1
(45) Date of Patent: Jan. 29, 2002

(54) MULTI-LAYER CORROSION RESISTANT COATINGS

(75) Inventor: Michael J. Halliwell, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/556,929

(22) Filed: Apr. 21, 2000

(51) Int. Cl.[7] ................................................. C23C 4/04
(52) U.S. Cl. ....................... 427/447; 427/450; 427/452; 427/454; 427/455; 427/456
(58) Field of Search ................................ 427/447, 450, 427/452, 454, 455, 456

(56) References Cited

U.S. PATENT DOCUMENTS

| | | | | |
|---|---|---|---|---|
| 2,697,058 A | * | 12/1954 | Lasak | 427/447 |
| 2,716,075 A | * | 8/1955 | Wiese | 427/447 |
| 2,866,718 A | * | 12/1958 | Guzzetta | 427/447 |
| 4,206,248 A | | 6/1980 | Schmidlin | 427/27 |
| 4,812,335 A | | 3/1989 | Kuwajima et al. | 427/407.1 |
| 5,041,713 A | | 8/1991 | Weidman | 219/121.51 |
| 5,106,910 A | | 4/1992 | Weidman et al. | 525/178 |
| 5,285,967 A | | 2/1994 | Weidman | 239/80 |
| 5,322,715 A | | 6/1994 | Jouck et al. | 427/409 |
| 5,439,710 A | | 8/1995 | Vogt et al. | 427/407.1 |
| 5,585,146 A | | 12/1996 | Uenaka et al. | 427/407.1 |

OTHER PUBLICATIONS

Metals Handbook, Ninth Edition, Vol. 5: Surface Cleaning, Finishing, and Coating, American Society For Metals, p. 361, 1982 (No month date).*

* cited by examiner

Primary Examiner—Katherine A. Bareford
(74) Attorney, Agent, or Firm—Bobby D. Scearce; Thomas L. Kundert

(57) ABSTRACT

Multi-layer corrosion resistant polymer composite coatings are described wherein a first coating layer is applied by high velocity high temperature spray, thermal spray, plasma spray, fluidized bed, hot melt or electrostatic spray onto an unprepared, particle embedded or alternatively prepared substrate, and the outer surface of the still warm first layer is roughened by embedding particles therein or the outer surface is roughened mechanically, and a second coating layer is applied thereover. Filler powder may be added to one or both of the layers to substantially match the thermal expansion coefficients of the two layers.

10 Claims, 1 Drawing Sheet

MULTI-LAYER CORROSION RESISTANT COATINGS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems and methods for the application of corrosion resistant coatings to metallic or non-metallic substrates, and more particularly to a multilayer polymer composite coating and method for applying the coating using polymer powders.

Conventional methods for applying protective polymer coatings to metallic substrates include the high temperature, high velocity polymer powder spray. The resultant coatings, however, are often characterized by ineffective adherence to the substrate and/or subsequent coating layers and consequent peeling of the coating, loss of desired properties such as bonding to another material, appearance, or corrosion protection of a metallic substrate. The problem with peeling is especially acute in the application of multiple coatings. For example, in a typical application of a polyolefin coating using high velocity (600 miles per hour (mph)) thermal powder spray onto a steel (1010 cold rolled) substrate, a high velocity thermal sprayed polyfluoride powder resin thereafter applied over the polyolefin coating peeled almost immediately. In other examples, a second polyolefin coating applied over the same previously high velocity thermal sprayed polyolefin resin separated from the first coating during environmental exposure and subsequently peeled off. Similar deficiencies in coatings applied using other polymers have been noted. In accordance with governing principles of the invention, it was hypothesized that the failures resulted from mismatch in thermal expansion coefficients of the two polymer coatings and/or lack of chemical bonding sites or surface bonding and/or slip reducing structure at the interface of the two coatings.

The invention solves or substantially reduces in critical importance problems in the prior art by providing a multi-layer polymer composite coating and method for applying adherent polymer coatings using powders containing two non-polar or slightly polar resins or a non-polar or slightly polar resin and a polar thermoplastic or thermoset resin. The substrate or resin surface of the first coating may be roughened by embedding particles into the substrate or soft first coating. The substrate or coating may be softened by heating to assist embedment and fusion with the particles. The particles can be a single type or mixture of cold to hot, metal, ceramic mineral, or corrosion inhibiting powders, such as stainless steel, aluminum, boron nitride, silica, zinc or zinc plus di-iron phosphate. Additionally or alternatively, filler powder may be added to the first coating plastic powder before or during the spraying process.

The coefficient of thermal expansion of the selected plastic-filler combination of the first and subsequent coating would be selected to improve the match with the coefficient of thermal expansion of the substrate or subsequent filled or unfilled second coating resin. One preferred powder spray process, high velocity thermal spray, drives the first coating deep into the existing and developed structure of the substrate or prepared resin coating, resulting in excellent grip and adhesion to endure the strains of temperature cycling caused by the difference in coefficients of thermal expansion between the substrate and first or subsequent coating. A preferred method of applying the powders to the soft resin is with sand blasting techniques. Velocity and temperature are adjusted to obtain embedment of the particles. A wet or very soft resin requires minimal velocity. For example, a still hot fluidized bed applied nonpolar resin is coated with zinc powder and subsequently overcoated, or, an electrostatically applied slightly polar, partially cured (soft), resin is coated with silica particles and subsequently overcoated. The particles can be applied with dipping in a fluidized bed, air assisted spray, passing through a gravity curtain of particles, etc.

The invention provides low cost, multi-layer polymer coatings having improved corrosion resistance, adjustable colors and high toughness as compared to conventional coatings. The invention allows multi-layer coatings of a low cost primer coat with excellent corrosion properties overlaid with a thin higher cost layer having other desired physical properties (e.g., improved ultraviolet light resistance) and superior moisture, temperature cycling, gloss, hardness and excellent scratch resistance.

It is therefore a principal object of the invention to provide improved corrosion resistant coatings for metallic or non-metallic substrates.

It is another object of the invention to provide corrosion resistant polymer coatings for metallic or non-metallic substrates.

It is another object of the invention to provide a coating that is exceptionally resistant to undercutting corrosion or delamination from the substrate.

It is another object of the invention to provide a multilayer coating that is exceptionally resistant to internal delamination.

It is another object of the invention to provide a coating that is exceptionally resistant to undercutting corrosion or delamination from an embedded matrix.

It is another object of the invention to provide multi-layer corrosion resistant polymer coatings for substrates.

It is another object of the invention to provide low-cost corrosion resistant polymer coatings.

It is another object of the invention to provide active corrosion protection to coatings, while providing exceptional resistance to undercutting corrosion or delamination from the substrate.

It is another object of the invention to provide a multi-layer corrosion resistant coating for a substrate wherein the coefficients of thermal expansion of the layers are substantially matched in order to avoid separation of the layers or peeling of the multi-layer coating from the substrate.

It is a further object of the invention to provide peel resistant polymer coatings having improved toughness, hardness, shear strength, creep resistance, scratch resistance, gloss, appearance and weathering resistance.

It is a further object of the invention to provide a corrosion resistant coating using non-polar and non-polarizable polymers.

It is a further object of the invention to provide an improved method for applying corrosion resistant polymer coatings.

It is another object of the invention to provide corrosion resistant polymer coatings for environmental protection of equipment components, vehicle parts, weapons, concrete reinforcement steel and building structures.

These and other objects of the invention will become apparent as a detailed description of representative embodiments proceeds.

SUMMARY OF THE INVENTION

In accordance with the foregoing principles and objects of the invention, multi-layer corrosion resistant polymer composite coatings are described wherein a first coating layer is applied by high velocity high temperature spray, thermal spray, plasma spray, fluidized bed, hot melt or electrostatic spray onto an unprepared, particle embedded or alternatively prepared substrate, and the outer surface of the still warm first layer is roughened by embedding particles therein or the outer surface is roughened mechanically, and a second coating layer is applied thereover. Filler powder may be added to one or both of the layers to substantially match the thermal expansion coefficients of the two layers.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
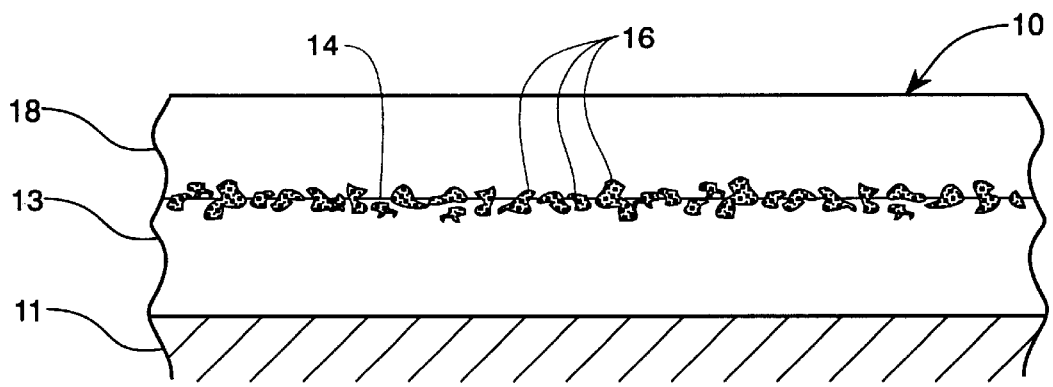
FIG. 1 shows a schematic view in section of a representative multi-layer corrosion resistant coating deposited on a substrate according to the invention.

Referring now to the drawings, FIG. 1 shows a schematic view in section of a representative multi-layer corrosion resistant coating 10 deposited on a substrate 11 according to the invention. In accordance with a principal feature of the invention, substrate 11 may first be cleaned by any well known cleaning process, may be roughened by known roughening methods or particles embedded with electric arc or high velocity thermal spraying or similar process, and a first polymer layer 13 may be applied to substrate 11 by thermal or plasma spraying polymer powder onto substrate 11 at high velocity or low velocity, or by fluidized bed, or by electrostatic spraying. Typical polymer powder compositions which may be utilized in the practice of the invention include thermoplastic type polymers such as polyethylene, polypropylene, nylon, polytetrafluoroethylene (TEFLON), polystyrene, polyester, acrylic, polymethylmethacrylate, acrylonitrile butadiene styrene (ABS), polyvinyl chloride (PVC), polybutylene, polycarbonate, polyaramid (KEVLAR), polysulfone, polyimide, tar, wax, latex, polyvinylidene chloride, polychlorotrifluoroethylene, cellulose acetate, phenolics, nitrophenolics, polyetheretherketone (PEEK), phenol-formaldehyde, or other flowable polymers or thermoset type polymers such as polyester, epoxy, acrylic, vinyl ester, polyurethane, styrene butadiene (SBR), silicone, polyimide, polyurea, polysulfone, phenolics, nitrophenolics. Although powder size range is not critical to the process described herein, the preferred size range for polymer powders useful in the practice of the invention may be from about 1 to about 250 microns. The powdered polymers are sprayed onto substrate 11 at about 1 to 950 mph and about 50 to 2,500° F. The outer surface 14 of first layer 13 is then roughened in order to effect mechanical interlocking of a second layer with first layer 13. The surface roughening may be accomplished by any suitable mechanical means as would occur to the skilled artisan practicing the invention, such as sandpaper, grinding wheels, wire brush, vibratory media, or sand blasting, but may preferably be achieved by spraying and partially embedding hard particles 16 into surface 14 of first layer 13 while layer 13 is warm (soft and flowable) immediately following the thermal or plasma spraying process. Particles 16 useful for the roughening step may include hard (unmolten, cold) polymer powder or a filler material such as sand, alumina, aluminum, titanium nitride, tri-alumina hydrate, calcium carbonate, calcium sulfate, calcium oxide, zinc oxide, magnesium oxide, carbon, carbon fiber, carbon black, boron nitride, silica, beryllium oxide, glass, mica, zinc, furnace ash, clay, color pigments, metal powder, metal flake, or other material suitable for the purpose as would occur to the skilled artisan practicing the invention, in a size range preferably of from about 0.1 to 400 microns.

A second coating layer 18 may then be applied over the roughened surface 14 or particles 16 imbedded therein, using any of the aforementioned processes, the same or different from that with which first layer 13 was applied, to form the finished protective polymer coating 10 structured as suggested in FIG. 1. If the second coating is applied as a liquid at low velocity, the particles or roughness on the surface of the first coating must have a feature dimension surface energy and spacing to provide greater than 10% surface coverage greater than 10 mils surface roughness to get good wetting and adhesion.

Figure 2:
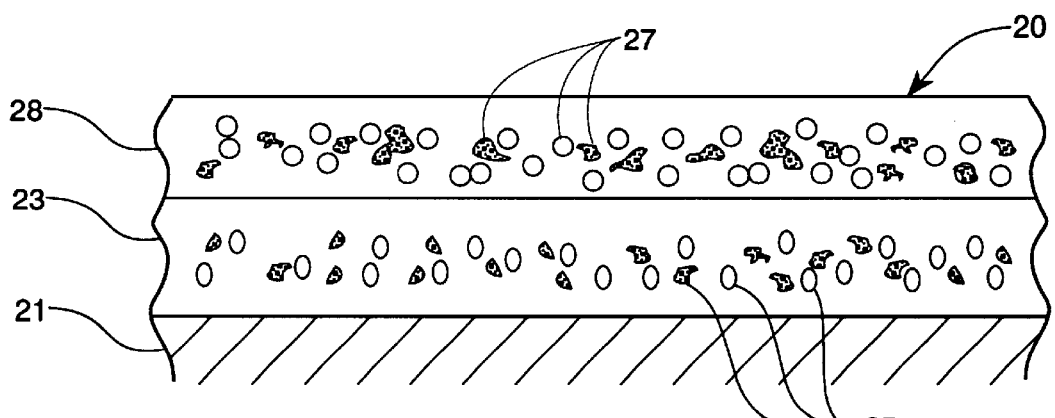
FIG. 2 shows a schematic view in section of a second multi-layer corrosion and peel resistant coating deposited on a substrate according to a second aspect of the invention in order to match the coefficients of thermal expansion of the layers comprising the coating.

Referring now to FIG. 2, shown therein is a schematic view in section of a second multi-layer corrosion resistant coating 20 deposited onto a substrate 21 in accordance with a second aspect of the invention wherein the coefficients of thermal expansion of first layer 23 and second layer 28 comprising coating 20 are matched as closely as practicable to alleviate thermal strain within coating 20 which may result in peeling. Accordingly, fillers 25, 27 having respective characteristic coefficients of thermal expansion are added in appropriate quantities to one or both of the layers 23, 28 in order to adjust the coefficients of each layer 23, 28 into substantially matching relationship. Typical powdered materials useful as fillers 25, 27 in the FIG. 2 embodiment of the invention include those useful a particles 16 of FIG. 1, or other materials occurring to the skilled artisan practicing the invention, filler 25, 27 material selection not considered limiting of the invention herein. The material may be selected also to obtain other desired properties on the composite coating, such as color, heat reflection, heat conduction, scratch resistance, impact resistance, chemical resistance, environmental stability, or application properties.

Figure 3:
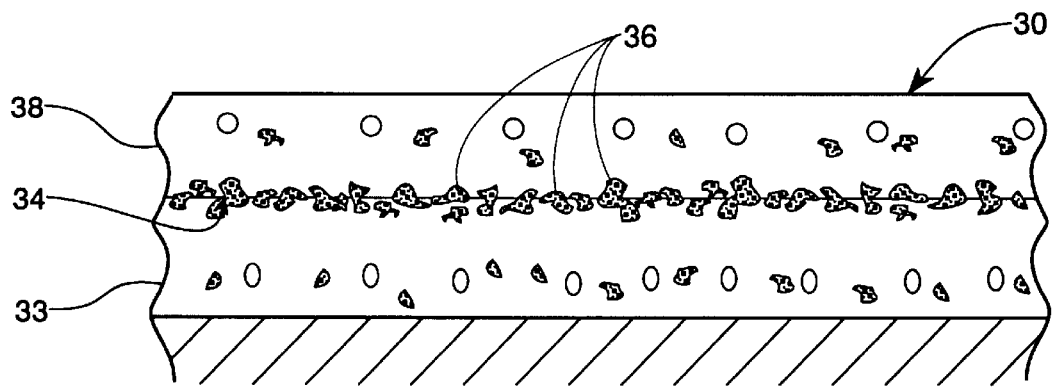
FIG. 3 shows a schematic view in section of another multi-layer corrosion resistant coating deposited on a substrate according to the invention comprising two thermal expansion coefficient matching layers and an intermediate layer of particles.

Referring now to FIG. 3, shown therein is a schematic sectional view of a preferred multilayer corrosion resistant coating 30 structure according to the invention which combines the characteristics of coatings 10, 20 of FIGS. 1,2 and comprises two thermal expansion coefficient matching layers 33, 38, similar in structure and composition to layers 23, 28 of FIG. 2, and an intermediate layer of particles 36, similar in size, composition and function, to particles 16 of FIG. 1, at the interface 34 of layers 33, 38.

In the application of corrosion resistant coatings according to the invention with thermal spray techniques, the substrate to be coated may be first heated to a temperature (about 50 to 300° F., preferably about 250° F.) sufficiently high enough to remove moisture and to facilitate polymer melting/wetting. A polymer layer is then applied to the substrate by thermal spray. The preferred method of powder application is high velocity (about 10 to about 950 mph, preferably about 600 mph) thermal spray preferably with a reducing gas propellant and a reducing gas shielding gas to prevent polymer oxidation during the spray process. Application of the high temperature polymer powder spray may best be accomplished utilizing commercially available high-velocity thermal spray equipment manufactured by Weidman Inc., Fort Myers, Fla.

In the thermal spray process, molten powder (together with any selected thermal expansion coefficient adjusting filler for forming the layers of FIG. 2) hits the substrate surface and flows into a substantially continuous film over the substrate surface. Hard particulate material (16 of FIG. 1) is then applied to the molten polymer surface to improve film properties, such as scratch resistance, coating interface stability against peeling, and immunity to thermal cycling.

Alternative methods for applying the polymer coatings may include plasma spray wherein an extended electric discharge arc heats the propellant gas and powder during the spray process, the polymer powder may be heated by various oxidation/reduction gas thermal spray systems known in the applicable art and blown onto the substrate at low velocity, or by fluidized bed, or by electrostatic spraying.

The invention therefore provides improved corrosion resistant coating for metallic or other material substrates comprising structures exposed to corrosive environments. It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

I claim:

1. A method for applying a multi-layer corrosion resistant polymer composite coating to a substrate, comprising the steps of:
   (a) providing a first source of a first polymer powder and a second source of second polymer powder;
   (b) generating a first high temperature thermal spray of said first polymer powder for spraying a first coating of said first polymer powder onto a substrate;
   (c) applying said first powder as said first coating onto said substrate using said thermal spray;
   (d) spraying said first coating with particles whereby said particles embed in the surface of said first coating and present a roughened surface on said first coating;
   (e) generating a second high temperature thermal spray of said second polymer powder for spraying a second coating of said second polymer powder onto said rough surface of said first coating; and
   (f) applying said second powder as said second coating onto said first coating and said particles, whereby said second coating is firmly adhered to said first coating by said roughened surface presented by said particles embedded therein.

2. The method of claim 1 wherein said first polymer and said second polymer are thermoplastic polymers each selected from the group consisting of polyethylene, polypropylene, nylon, polytetrafluoroethylene, polystyrene, polyester, acrylic, polymethylmethacrylate, acrylonitrile butadiene styrene, polyvinyl chloride, polybutylene, polycarbonate, polyaramid, polysulfone, polyimide, tar, wax, latex, polyvinylidene chloride, polychlorotrifluoroethylene, cellulose acetate, phenolics, nitrophenolics, polyetheretherketone, and phenol-formaldehyde, or thermoset polymers each selected from the group consisting of polyester, epoxy, acrylic, vinyl ester, polyurethane, styrene butadiene, silicone, polyimide, polyurea, polysulfone, phenolics, and nitrophenolics.

3. The method of claim 1 further comprising a filler material in at least one of said first polymer powder and said second polymer powder for substantially matching the respective thermal expansion coefficients of said first and second coatings.

4. The method of claim 1 wherein the steps of generating the first and second high temperature thermal sprays is performed using a thermal spray gun.

5. The method of claim 4 wherein said first and second polymer powders are sprayed at a velocity in a range of from about 10 to 950 mph.

6. The method of claim 5 wherein said first and second polymer powders are sprayed at a velocity of about 600 mph.

7. The method of claim 1 wherein said first and second polymer powders are in a size range of from about 1 to about 250 microns.

8. The method of claim 1 wherein said particles comprise a material selected from the group consisting of polymer powder, sand, alumina, titanium nitride, tri-alumina hydrate, calcium carbonate, calcium sulfate, calcium oxide, zinc oxide, magnesium oxide, carbon, carbon black, boron nitride, silica, beryllium oxide, glass, mica, furnace ash, clay, and metal powder or flake.

9. The method of claim 8 wherein said particles are in a size range of from about 0.1 to 400 microns.

10. The method of claim 1 further comprising the step of heating the substrate to a temperature in a range from about 50 to about 300° F. prior to spraying said first coating.

* * * * *